United States Patent [19]
Seok

[11] Patent Number: 6,122,698
[45] Date of Patent: Sep. 19, 2000

[54] DATA BUS HAVING CONDUCTING LINES DRIVEN AT MULTIPLE ADJUSTABLE CURRENT LEVELS TO TRANSFER MULTIPLE-BIT DATA ON EACH CONDUCTING LINE

[75] Inventor: Yong Sik Seok, Shrewsbury, Mass.

[73] Assignee: Samsung Electronics Co., LTD, Rep. of Korea

[21] Appl. No.: 09/061,631

[22] Filed: Apr. 16, 1998

[51] Int. Cl.$^7$ .................................................... G06F 13/00
[52] U.S. Cl. .......................... 710/129; 710/100; 710/126
[58] Field of Search ................................... 710/129, 100, 710/126; 709/222; 713/300

[56] References Cited

U.S. PATENT DOCUMENTS

| | | | |
|---|---|---|---|
| 5,191,581 | 3/1993 | Woodbury et al. | 370/85.9 |
| 5,513,327 | 4/1996 | Farmwald et al. | 710/129 |
| 5,687,330 | 11/1997 | Gist et al. | 710/129 |
| 5,881,247 | 3/1999 | Dombrosky et al. | 710/100 |
| 5,949,253 | 9/1999 | Bridgewater, Jr. | 326/86 |

*Primary Examiner*—Ayaz R. Sheikh
*Assistant Examiner*—Tim Vo
*Attorney, Agent, or Firm*—Samuels, Gauthier & Stevens LLP

[57] ABSTRACT

A bus interface system and method includes a driver circuit and a receiver circuit coupled on opposite ends of a conducting line of a bus. The driver circuit drives an adjustable current through the conducting line to the receiver circuit. The current level of the adjustable current can be adjusted to one of several levels according to the data item being transferred across the line. The receiver circuit receives the adjustable current and detects the level of the current to identify the information encoded by the signal being transferred. The current level can be set to one of several values such that the information being transferred by the signal can be in one of several possible states. The system therefore is capable of encoding more data than binary systems. Higher data bus transfer rates can therefore be realized.

20 Claims, 2 Drawing Sheets

DATA BUS HAVING CONDUCTING LINES DRIVEN AT MULTIPLE ADJUSTABLE CURRENT LEVELS TO TRANSFER MULTIPLE-BIT DATA ON EACH CONDUCTING LINE

BACKGROUND OF THE INVENTION

In digital electronic systems, multiple-bit words are transferred between and within circuits over parallel buses. The buses typically include multiple parallel conducting lines over which signals are transferred. In a typical conventional bus, each bit of a multiple-bit word is transferred over the bus on a single respective parallel conducting line. In parallel systems, all of the bits of a single word are transferred simultaneously across the bus on the parallel lines. Each circuit or system with access to the bus interfaces with the bus via interface circuitry which can include a bus driver circuit for transmitting data signals as well as a receiver circuit for receiving bus signals.

In conventional systems, data and command words are encoded in binary data format, i.e., each bit can assume one of two states and can therefore represent one of two conditions or items of information. This is typically accomplished by setting a voltage on a bus line to one of two possible voltage levels. The bus driver circuitry is capable of applying one of the two voltage levels to the bus according to the desired condition for the data bit being carried by the particular conducting line. The receiver circuit is capable of detecting the applied voltage on the line and converting that voltage to the appropriate data bit. For example, in CMOS systems, the bits are represented by nominal voltage levels of 0 volts and +5 volts. The driver circuitry for each bus line is capable of setting the voltage level of the bus line at either 0 volts or +5 volts, depending on the data bit being represented by the signal transferred over the line.

In some systems, buses are bidirectional. That is, data signals can be transferred across the bus lines in either direction. To accommodate this feature, both ends of the conducting lines include both driver and receiver circuitry.

As systems have become more complex, demand has increased for high rates of data transfer across buses. Two approaches have typically been used to accommodate this increase in demand for higher transfer rates. Buses have been made wider, i.e., provided with an increased number of conducting lines, such that they can carry more parallel data simultaneously. Data transfer rates have also been increased in some systems by increasing the frequency or clock rate at which transfers take place.

Both of these approaches have limits. For example, increasing the number of bus lines increases the physical size of the bus and the associated circuitry, which runs counter to the continuously increasing demand for smaller circuitry and circuit board hardware. Increasing the frequency or clock rate of the system tends to increase power consumption. Therefore, the frequency is limited by, among other things, a maximum allowable or desired power consumption.

Also, prior systems have drawbacks because they require that bus voltages be switched very quickly. Bus capacitances can slow voltage switching, such that the frequency of data transfers is limited. Also, switching voltages on the capacitively coupled bus lines can introduce noise which degrades performance and can increase power consumption.

SUMMARY OF THE INVENTION

The present invention is directed to a bus interface and method for transferring a signal over a bus which includes at least one conducting line for carrying the signal. The bus interface of the invention includes a driver circuit which can drive an adjustable current through the conducting line of the bus. The driver circuit can also adjust the current level of the adjustable current according to a data item or item of information, e.g., data bit, which is represented by the signal being transferred over the conducting line. The bus interface also includes a receiver circuit coupled to the conducting line which is adapted to receive the adjustable current and to detect the current level of the adjustable current in order to identify the item of information represented by the signal.

The current level can be adjusted to one of a plurality of possible current levels which are used to represent the data item encoded by the signal being carried by the conducting line. Each current level corresponds to one of a plurality of states that the item of information can assume. For example, if the item of information represents a data parameter or number, each current level to which the adjustable current can be adjusted can represent a possible value for the parameter or number. If the number can assume one of four possible states, for example, then the adjustable current can be set to one of four possible current levels. The receiver circuit receives the adjustable current and detects the current level of the adjustable current and identifies the state of the item of information (parameter value) associated with the current level.

In one embodiment, the current level can be set to more than two possible levels. Consequently, the data item can assume one of more than two possible states. Hence, using this format, the bus lines can carry more information than can be encoded using a binary data format.

In one embodiment, the driver circuit includes a current switching circuit which can selectively switch portions of the adjustable current such that the portions can be combined to determine the level of the adjustable current. In one embodiment, this switching circuitry includes multiple transistors, each of which can be selectively activated to pass a portion of the adjustable current. The individual portions of current from the individual transistors are summed to generate the total adjustable current driven through the bus line. In one embodiment, field-effect transistors are used to promote fast switching speeds and low power consumption.

In one embodiment, the receiver circuit includes a detector circuit for detecting the current level of the adjustable current. The detector circuit can include a conversion circuit that converts the adjustable current to a voltage level. This conversion circuit can include a known resistance through which the adjustable current or a predetermined portion thereof is made to flow. By detecting the voltage drop across the resistance, the level of the adjustable current can be detected. The detector circuit can also include a comparison circuit such as a voltage comparator to which this voltage is applied. The comparator circuit is used to compare the voltage to one or more predetermined voltage thresholds. Selection of the voltage thresholds is used to determine the value or state that should be associated with the current level of the received adjustable current.

In one embodiment, multiple comparator circuits with multiple voltage thresholds are used. In this embodiment, each comparator circuit in a receiver has a different threshold voltage to which the converted voltage level of the incoming signal is applied. In one embodiment, the state or value associated with the signal is determined by identifying the number of voltage thresholds exceeded, i.e., the number of comparators switched to an active state by the converted voltage signal. The threshold voltages are selected such that the number of comparators switched to the active state is related to the value or state of the incoming signal.

The bus interface and method of the invention can be applied to various system configurations and forms of buses. For example, the bus interface circuitry can be implemented in separate integrated circuits and, therefore, can provide the interface to an off-chip bus between the circuits. Alternatively, the invention can be used to provide bus communications on a single chip. In this case, the driver circuitry, receiver circuitry and bus can all be implemented on the single chip. In another implementation, all of the bus interface circuitry can be implemented on a single chip while the bus can be an external off-chip bus.

The bus interface circuitry of the invention can be implemented with a unidirectional bus or a bidirectional bus. In the case of a bidirectional bus, both driver circuitry and receiver circuitry in accordance with the invention are coupled to both ends of each line of the bus. Appropriate switching and/or multiplexing and demultiplexing circuitry is used to connect the driver or receiver circuitry to the line depending on the direction in which data is being transferred.

The present invention provides numerous advantages over other bus communication systems. For example, because currents are switched instead of voltages in the invention, the problems of slow speed and noise coupling caused by bus capacitance in voltage-switching buses of prior systems are virtually eliminated. Also, the bus communication system of the invention allows for the encoding of multiple, i.e., more than two, values or states in a single line. As a result, much more data can be encoded and transferred than could be encoded and transferred in prior binary encoded systems. Therefore, overall data transfer rates can be improved without the need to expand the physical size of the bus or to operate the bus at a faster frequency. Therefore, the problems found in prior systems of increased bus and circuitry size and increased power consumption are avoided in the system of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
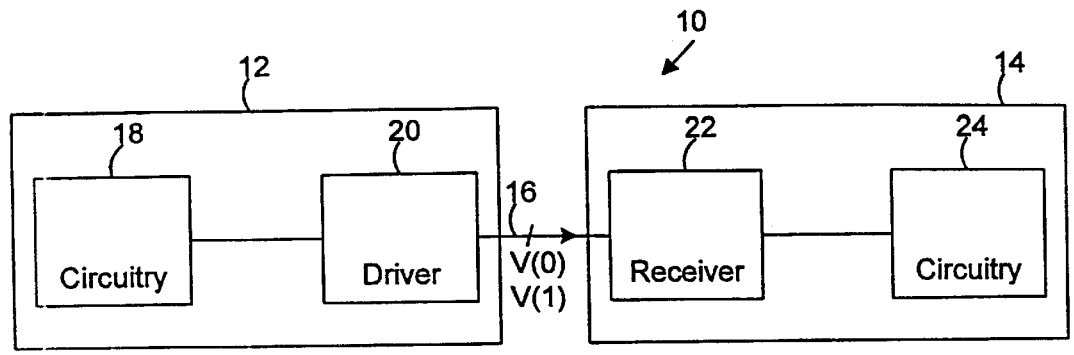
FIG. 1 is a schematic block diagram of a prior art bus communication system.

FIG. 1 is a schematic block diagram of a prior art bus communication system 10. The system 10 includes a transmitting system 12 and a receiving system 14 which communicate with each other via a bus 16. The transmitting system 12 includes a driver 20 which provides the interface between system circuitry 18 and the bus 16. The receiving system 14 includes receiver circuitry 22 which receives signals from the bus 16 and forwards them to other system receiver circuitry 24. The driver 20 generates signals to be transferred on the bus 16 in a format which is compatible for reception by the receiving circuitry 22.

The bus 16 typically includes multiple parallel conducting lines. The driver 20 includes individual driving circuitry coupled to each conducting line to separately drive each conducting line as required. The receiver 22 includes individual receiver circuitry coupled to each conducting line which can independently receive signals on each conducting line.

In typical conventional systems, the system 14 will also be capable of transmitting signals to system 12 via the bus 16. This can be accomplished by a redundant bus which transfers signals in the direction opposite to that shown in FIG. 1. In this case, the system 14 would also include driver circuitry, and the system 12 would also include receiver circuitry, and the redundant bus in the direction opposite to that shown for bus 16 would connect between them. Alternatively, the bus 16 can be a bidirectional bus capable of transferring signals in both directions. In this case, both the transmitting system 12 and receiving system 14 include driver/receive circuitry capable of driving and receiving signals on the bus.

In the conventional system 10 shown in FIG. 1, data signals transferred on the bus 16 are typically encoded in a binary format, i.e., the signal transferred on the line of the bus can assume one of two possible states. In the conventional system, each of these states is identified with a voltage level. The driver circuit 20 sets the voltage level of the bus line at the level which corresponds to the binary value being transferred. In such a binary system, two voltage levels are possible, referred to in FIG. 1 as V(0) and V(1). For example, in a CMOS system, nominal values for the two voltages are V(0)=0 volts and V(1)=+5 volts, with V(0) representing a logic 0, inactive or low state and V(1) representing a logic 1, active or high state.

Figure 2:
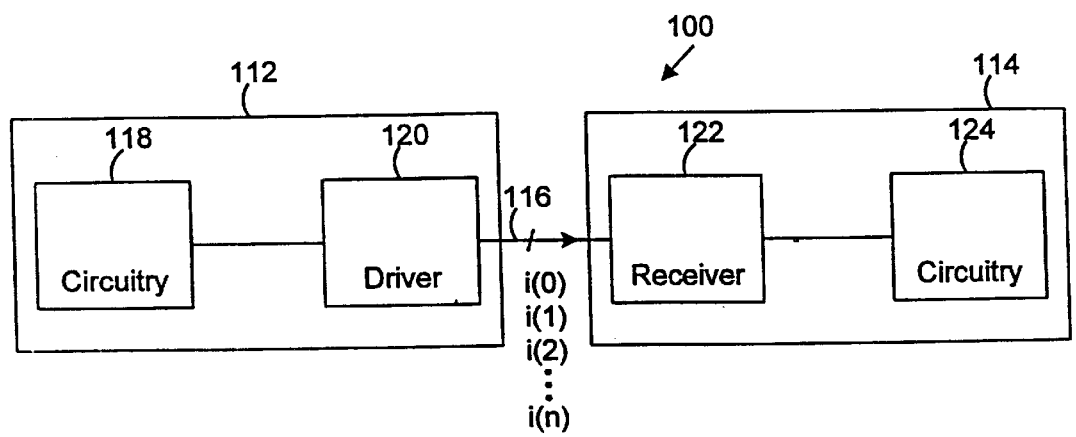
FIG. 2 is a schematic block diagram of a bus communication system in accordance with the present invention.

FIG. 2 is a schematic block diagram of one embodiment of a bus communication system 100 in accordance with the present invention. The system 100 of the invention generally includes a transmitting system 112 which transmits signals to a receiving system 114 over a multiple-conducting-line bus 116. It will be understood that the system can also include a bidirectional bus, in which case both systems 112 and 114 would include both driver and receiver circuitry. In the embodiment shown in FIG. 2, the driver circuit 120 of system 112 provides the interface between the remaining circuitry 118 of the transmitting system 112 and the bus 116. The receiver circuit 122 provides the interface between the remaining circuitry 124 of the receiving system 114 and the bus 116.

The driver circuit 120 of the invention can drive each conducting line of the bus 116 at one of multiple current levels i(0), i(1), i(2), . . . , i(n). The number n of possible current levels is based on the capabilities and constituent hardware of the driver circuit 120, as described below in detail. Each current level i is associated with the state of a data item being transferred across the bus 116. For each line in the bus 116, the driver circuitry 120 can pass a current through the line at a level which is associated with a state of the data item being transferred on that line. For example, where a particular data item can assume one of four states, four current levels, i(0), i(1), i(2) and i(3), can be driven through the associated bus line by driver 120. The receiver circuitry 122 receives and discriminates the current for each line and identifies the state of the data item associated with the current level.

Figure 3:
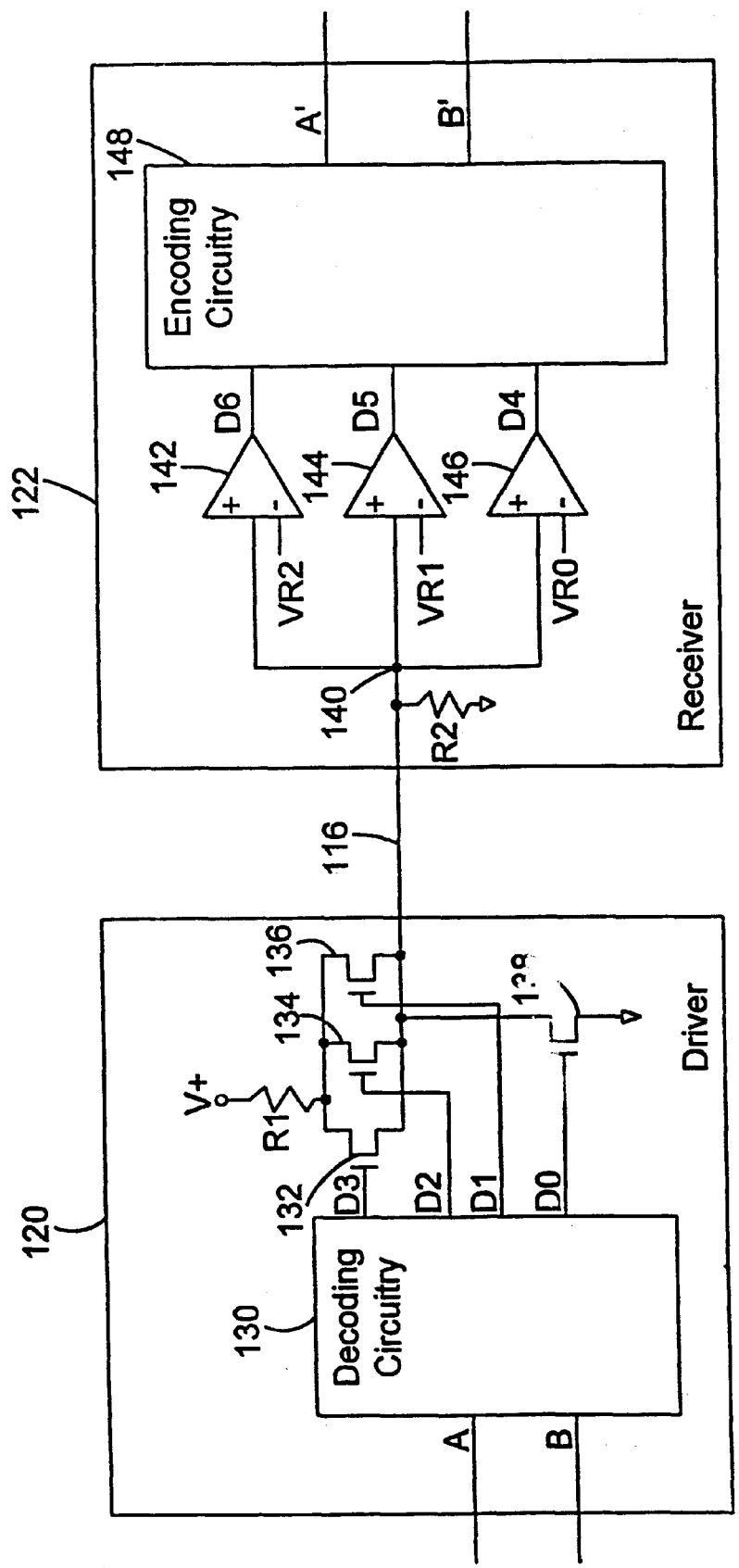
FIG. 3 is a schematic detailed block diagram of a bus communication system in accordance with the present invention.

FIG. 3 is a detailed block diagram of one embodiment of the driver circuit 120 and one embodiment of the receiver circuit 122 of the invention which are connected across a single conducting line of the bus 116. In the example shown in FIG. 3, four possible current levels (including zero current) can appear on the conducting line of the bus 116 and, therefore, four states of each data item can be represented. It will be understood that the description can be extended to any number of states and any number of current levels.

In the embodiment shown in FIG. 3, because four possible current levels can appear on each bus line, the levels can be used to represent the four states or values which can be encoded by two binary digits. Therefore, this particular embodiment of the invention is described in the context of transferring data represented by two binary digit inputs labeled A and B. At the receiving end of the system the receiver circuitry 122 encodes the binary digit inputs A, B as binary digit outputs A', B', respectively. It will be understood that the invention described herein as using multiple current levels to transfer data items across a bus is applicable in settings other than transferring values encoded by binary digits.

In the embodiment of the invention shown in FIG. 3, the driver 120 includes decoding circuitry 130 which receives binary digits A, B as inputs. The decoding circuitry 130 is adapted to activate the output lines D0, D1, D2 and D3 according to the truth table shown in Table 1 to selectively activate the field-effect transistors (FETs) 132, 134, 136 and 138. Referring to Table 1, the values 0 and 1 refer to logic levels. For the outputs D0, D1, D2, and D3, the logic level 0 indicates a voltage of approxiametly 0 volts such that the FET to which an output is connected does not conduct between its source and drain. A logic 1 indicates a voltage applied to the gate of the corresponding FET so as to cause conduction between the source and drain of the FET. The current conducted by a FET is generated by the source labeled V+ and is partially limited by a resistance R1.

TABLE 1

| A | B | D0 | D1 | D2 | D3 |
|---|---|----|----|----|----|
| 0 | 0 | 1  | 0  | 0  | 0  |
| 0 | 1 | 0  | 1  | 0  | 0  |
| 1 | 0 | 0  | 1  | 1  | 0  |
| 1 | 1 | 0  | 1  | 1  | 1  |

Referring to Table 1 and FIG. 3, when AB=00, only output D0 is active such that FET 138 conducts current. The corresponding bus line is effectively pulled to ground, and no current flows through the bus. When AB=01, only D1 is active such that only FET 136 conducts current. Since D0 is low, FET 138 does not conduct and all current flowing through FET 136 flows into the bus line. When AB=10, output lines D1 and D2 are active such that FETs 134 and 136 both conduct current. The current is combined, and the combined current flows through the conducting line of the bus 116. In this case, signal D0 is inactive such that FET 138 does not conduct. With two of the FETs 134 and 136 conducting, the current through the bus line is at a level different that the level for AB=01. When AB=11, outputs D1, D2, and D3 are all active such that all three FETs 132, 134, and 136 conduct current. All three currents are summed and flow through the conducting line of the bus 116. Hence, for each possible state of the binary input lines A and B, the driver circuitry 120 drives a different level of current through the associated conducting line of the bus 116.

The current level set by the digital inputs A and B and driven by the driving FETs 132, 134 and 136 are received at receiver circuitry 122 connected to the corresponding line of the bus 116. Most of the current received is directed through a resistance R2 to develop a voltage at node 140, which is applied to the noninverting input of each of the voltage comparators 142, 144, 146. The threshold or reference voltages VR0, VR1, VR2 are applied to the inverting input of the comparators 146, 144, 142, respectively. Each voltage reference VR0, VR1, VR2 is generated by a separate voltage source and, in one embodiment, has a different voltage value.

Each comparator 146, 144, 142 will drive its respective output D4, D5, D6 to an active or high state when the voltage generated across resistance R2 at node 140 exceeds the respective voltage reference VR0, VR1, VR2. Since the voltage at node 140 depends on the current through the conducting line of the bus 116, then the number of active comparator outputs is determined by the state of the outputs D0, D1, D2, D3 of the decoding circuitry 130 in the driver circuitry 120. Since the outputs D0, D1, D2, D3 depend upon the states of the binary digit inputs A, B, the binary inputs A, B determine the states of the comparator outputs D4, D5, D6. In one embodiment, the relationship between the binary digit inputs A, B and the comparator outputs D4, D5, D6 is as specified in the truth table of Table 2.

TABLE 2

| A | B | D4 | D5 | D6 |
|---|---|----|----|----|
| 0 | 0 | 0  | 0  | 0  |
| 0 | 1 | 1  | 0  | 0  |
| 1 | 0 | 1  | 1  | 0  |
| 1 | 1 | 1  | 1  | 1  |

The voltage references VR0, VR1, VR2 are selected such that each incremental increase in current through the conducting line of the bus 116, which causes a corresponding incremental increase in the voltage at node 140, results in a single additional comparator output being switched to the active or high state. Referring to Table 2, when AB=00, as described above, no current is driven through the conducting line of the bus 116, such that no voltage is developed across resistance R2 at node 140. As a result, none of the voltage references VR0, VR1, VR2 are exceeded and, therefore, none of the comparator outputs D4, D5, D6 are in the active state. When AB=01, only FET 136 conducts current. The voltage reference VR0, VR1, VR2 are selected such that, under this condition, the voltage at node 140 exceeds only reference VR0 such that only comparator output D4 is active. When AB=10, FETs 134 and 135 conduct current causing a higher voltage to be developed at node 140. The voltage references VR0, VR1, VR2 are selected such that, under these circumstances, only comparator outputs D4 and D5 are in the active state. When AB=11, FETs 132, 134 and 136 all conduct and, therefore, generate a higher voltage at node 140. The voltage references VR0, VR1, VR2 are selected such that, under these circumstances, all three comparator outputs D4, D5, and D6 are in the active state.

The comparator outputs D4, D5, D6 are applied as inputs to encoding circuitry 148 which translates the states of the comparator outputs to outputs for binary digits A' and B'. The relationship between the comparator outputs D4, D5 and D6 and the binary digits A' and B' are shown in the truth table of Table 3. When all three comparator outputs are in the low state, A'B'=00. Therefore, when AB=00, A'B'=00. When D4 is active and D5 and D6 are inactive, A'B'=01 such that, when AB=01, A'B'=01. When D4 and D5 are active and D6 is inactive, A'B'=10, such that, when AB=10, A'B'=10. When all three comparator outputs are in the active state, A'B'=11, such that, when AB=11, A'B'=11.

TABLE 3

| D4 | D5 | D6 | A' | B' |
|----|----|----|----|----|
| 0  | 0  | 0  | 0  | 0  |
| 1  | 0  | 0  | 0  | 1  |
| 1  | 1  | 0  | 1  | 0  |
| 1  | 1  | 1  | 1  | 1  |

Therefore, the binary digits A and B are transferred across the line of the bus 116 by translating them into a current level at the transmit side and then detecting the current level at the receive side and encoding the current back to the original binary digit values. In accordance with the present invention, any of the four possible values that the binary digits A, B can assume can be transferred across the bus on a single conducting line.

An example of operation of the circuitry of FIG. 3 will now be described to illustrate the invention. For this example, it is assumed that the resistance R2 is selected to be 150 ohms and that V+ and R1 are selected such that each of the FETs 132, 134, 136 directs 10 ma of current onto the conducting line of the bus 116 when it is activated by one of the decoding circuitry outputs D1, D2, D3. Each 10 ma of current therefore generates a voltage V of 1.5 volts at the node 140 of the receiver circuitry 122. Therefore, the activation of each FET causes an incremental increase in bus line current of 10 ma which causes a corresponding incremental increase in the voltage V at the node of 140 of 1.5 volts.

In this example, the comparator reference voltage references are selected as follows:

VR0=1.0 volts;

VR1=2.0 volts;

VR2=4.0 volts.

In accordance with the truth table of Table 1, the states of binary digits A and B result in a current i through the conducting line of the bus 116 and voltage V at the node 140 in accordance with Table 4.

TABLE 4

| AB | Current i (ma) | Voltage V (volts) |
|----|----------------|-------------------|
| 00 | 0.0            | 0.0               |
| 01 | 10.0           | 1.5               |
| 10 | 20.0           | 3.0               |
| 11 | 30.0           | 4.5               |

Referring to Table 4 and the truth table of Table 3, when AB=00, the voltage V at node 140 is 0 volts; none of the comparator thresholds are exceeded, and none of the comparator outputs are driven to an active state. Therefore, A'B'=00. When AB=01, V=1.5 volts; only VR0=1.0V is exceeded such that only comparator output D4 is active. Therefore, A'B'=01. When AB=10, V=1.5 volts; both thresholds VR0=1.0V and VR1=2.0V are exceeded such that comparator outputs D4 and D5 are both active. Therefore, A'B'=10. When AB=11, V=4.5 volts; all three thresholds, VR0=1.0V, VR1=2.0V and VR2=4.0V are exceeded such that all three comparator outputs D4, D5 and D6 are in the active state. Therefore, A'B'=11.

While this invention has been particularly shown and described with references to preferred embodiments thereof, it will be understood by those skilled in the art that various changes in form and details may be made therein without departing from the spirit and scope of the invention as defined by the following claims.

For example, the decoding circuitry 130 can be selected to accommodate any number of possible states of the information being transferred across a bus line. Accordingly, the circuitry 130 would accommodate any number of binary digit inputs and any number of outputs used to drive the FETs. The number of FETs is also selected based on the number of possible states of the information to be transferred across the bus. The number of comparator circuits and voltage thresholds as well as the values of the voltage thresholds can also be selected based on the desired number of states of the signal being transferred. The encoding circuitry 148 can also be designed to accommodate the number of states and, therefore, the number of comparator outputs and binary digit outputs. The resistance values, bus currents, and threshold voltages can also be selected as desired for a particular system configuration and operation. The actual values used herein are for illustration purposes only and are not necessarily intended to represent actual values.

What is claimed is:

1. A bus interface for transferring information over a bus, the bus including at least one conducting line for carrying at least one respective signal, the bus interface comprising:

a driver circuit for driving an adjustable current through the at least one conducting line of the bus, the driver circuit setting a current level of the adjustable current according to a state of an item of information represented by the signal being carried by the at least one conducting line, the driver circuit setting the current level to one of more than two predefined current levels of the conducting line corresponding to a respective one of more than two corresponding predefined states of the item of information, such that each item of information represented by the signal being carried by each conducting line can assume one of more than two possible states; and a receiver circuit coupled to the conducting line for receiving the adjustable current and detecting the current level of the adjustable current to identify the state of the item of information.

2. The bus interface of claim 1 wherein the item of information is a portion of a data word being transferred over the bus, said portion of said data word being represented by more than two binary digits (bits).

3. The bus interface of claim 1 wherein the receiver circuit comprises a detector for detecting the current level.

4. The bus interface of claim 1 wherein the driver circuit comprises a current switching circuit for selectively switching portions of the adjustable current to adjust the current level.

5. The bus interface of claim 1 wherein the driver circuit and receiver circuit are on separate integrated circuits connected by the bus.

6. The bus interface of claim 1 wherein the driver circuit, receiver circuit and the bus are formed on a single integrated circuit.

7. The bus interface of claim 3 wherein the detector comprises a converter for converting the current level to a voltage level.

8. The bus interface of claim 4 wherein the current switching circuit comprises a plurality transistors for selectively passing a respective plurality of portions of the adjustable current.

9. The method of claim 6 wherein the driver circuit and receiver circuit are on separate integrated circuits connected by the bus.

10. The method of claim 6 wherein the driver circuit, receiver circuit and the bus are formed on a single same integrated circuit.

11. The bus interface of claim 7 wherein the detector further comprises a comparison circuit for comparing the voltage level to a plurality of threshold voltages.

12. The bus interface of claim 8 wherein the transistors are field-effect transistors.

13. A method of transferring over a bus, the bus including at least one conducting line for carrying at least one respective signal, the method comprising:

coupling a driver circuit to the at least one conducting line;

using the driver circuit, setting a current level of the adjustable current according to a state of an item of information represented by the signal being carried by the at least one conducting line, the driver circuit setting the current level to one of more than two predefined current levels of the conducting line corresponding to a respective one of more than two corresponding predefined states of the item of information, such that each item of information represented by the signal being carried by each conducting line can assume one of more than two possible states;

coupling a receiver circuit to the conducting line to receive the adjustable current from the conducting line; and using the receiver circuit, detecting the current level of the adjustable current to identify the state of the item of information.

14. The method of claim 13 wherein the item of information is a portion of a data word being transferred over the bus, said portion of said data word being represented by more than two binary digits (bits).

15. The method of claim 13 wherein the receiver circuit comprises a detector for detecting the current level.

16. The method of claim 13 wherein the driver circuit comprises a current switching circuit for selectively switching portions of the adjustable current to adjust the current level.

17. The method of claim 15 wherein the detector comprises a converter for converting the current level to a voltage level.

18. The method of claim 16 wherein the current switching circuit comprises a plurality of transistors for selectively passing a respective plurality of portions of the adjustable current.

19. The method of claim 17 wherein the detector further comprises a comparison circuit for comparing the voltage level to a plurality of threshold voltages.

20. The method of claim 19 wherein the transistors are field-effect transistors.

* * * * *